United States Patent [19]
Gonzalez-Posada Sanchez et al.

[11] Patent Number: 5,232,488
[45] Date of Patent: Aug. 3, 1993

[54] PROCEDURE FOR THE PURIFICATION AND RECOVERY OF MERCURY IN METALLIC FORM, FROM ROASTING GASES THAT CONTAIN THE SAME

[75] Inventors: Armando . Gonzalez-Posada Sanchez, Madrid; Miguel Fernandez Tallante, Granada, both of Spain

[73] Assignee: Consejo Superior De Investigaciones Cientificas, Madrid, Spain

[21] Appl. No.: 800,477

[22] Filed: Nov. 5, 1991

[30] Foreign Application Priority Data

Mar. 5, 1990 [ES] Spain ........................... 9000643

[51] Int. Cl.$^5$ ............................................ C22B 43/00
[52] U.S. Cl. ......................................... 75/431; 75/670
[58] Field of Search ............... 55/72; 75/742, 670, 75/431; 423/210

[56] References Cited
U.S. PATENT DOCUMENTS
3,961,031 6/1976 Yasui et al. ........................... 55/72

FOREIGN PATENT DOCUMENTS
2546697 1/1988 European Pat. Off. ............... 55/72

Primary Examiner—Melvyn J. Andrews
Attorney, Agent, or Firm—Darby & Darby

[57] ABSTRACT

A process is described for the recovery, in metallic form, of mercury present in roasting gases, containing $SO_2$, so that the purified gas has less than 0.1 mg/m3 of this element. Essentially, the system consists of a conventional device for the cooling and scrubbing of the gas; two irrigated towers with an acid solution of $Hg(SCN)_4{}^{2-}$ free $SCN^-$ and active carbon; two wet electrostatic precipitators, one in front of the first tower and another between them and a reactor for scrubbing the emulsion (soot) obtained from the condensation, with ammonium. All mercury-bearing tailings are recycled to the roasting oven at appropriate intervals, until under certain conditions the hot gases attain a mercury content of more than 40 mg/m3.

11 Claims, 2 Drawing Sheets

PROCEDURE FOR THE PURIFICATION AND RECOVERY OF MERCURY IN METALLIC FORM, FROM ROASTING GASES THAT CONTAIN THE SAME

SCOPE OF APPLICATION

The object of this invention is a new process for mercury cleaning when treating raw materials that contain it, recovering it in metallic form so that it does not pass in important amounts either into products obtained from those raw materials, or into manufacturing effluents.

INTRODUCTION

Mercury ore (cinnabar) has traditionally been the ore from which mercury is obtained. Although concentration of this mineral is easy, due to its dispersion within the ore veins a run of mine is usually treated with metal grades between 0.5 and 5% (equivalent to 5000–50,000 g/t) following grinding to adapt the material to the requirements of the oven.

Under roasting at some 650° C. the cinnabar breaks down into $SO_2$ and Hg which pass with the gases to the later cooling stage during which the majority of the mercury is condensed. Normally the rest of the elements accompanying the mercury remain in the tailings, although in some cases the presence of some elements such as Cl, Se and As must be taken into account since they may be prejudicial to metal recovery.

Of these, the chlorine is the most prejudicial since it easily combines with the mercury to first form volatile $HgCl_2$ and then insoluble $Hg_2Cl_2$.

The selenium has a behaviour similar to sulphur and, like it, the major part becomes $SeO_2$, although it may remain in elemental, volatile form and recombine with the Hg to form insoluble HgSe.

During roasting, the arsenic oxidises to form $As_2O_5$ and $As_4O_6$, the former with an acid nature combines with the metallic oxides and becomes arsenate in the tailings, while the latter goes to the gases and condenses during cooling as mercury.

In conventional mercury metallurgy, the sulphur content in the ore does not normally go beyond 1 to 5%. This means that the calorific power of the raw material is well below the amount needed to reach the mentioned 650° C., and therefore it is necessary to contribute external calories using combustion gases of propane-butane or fuel oil in an amount of some 450 Nm3/t or ore. Consequently the mercury content of these gases is between 10 and 100 g/Nm3, while after cooling to 40° C. this figure decreases to approximately 0.05 g/Nm3 that, together with 0.5 to 3% $SO_2$, are the emissions that these plants release to the atmosphere.

Simultaneously with the appearance around 1970 of restrictions on the use of mercury and on its content in industrial waste, the presence of this element was noticed, to a greater or lesser degree, in the majority of metallic sulphide concentrates, particularly blends in which it substituted isomorphically for zinc in its network. During the conventional process to treat these ores, during the roasting stage, mercury also passes into the gas but with the difference that here, due to its low content in the raw material (normally from 10 to 50 g/t) after gas cooling it remains in the gas either as a vapour or in the form of a fine dispersion.

As a consequence of the above, in smelters in which gas is still released to the atmosphere because of its low $SO_2$ content, mercury increases the problem of pollution even more. When, as is normal, the $SO_2$ in the gases is transformed into sulphuric acid, this holds the mercury and its content of the element may reach amounts between 10 and 60 ppm and even, in some cases, go beyond 100 ppm, figures that the majority of consumers do not want to admit in order to avoid pollution problems in their plants and/or products.

STATE OF TECHNOLOGY

In order to solve this problem, various processes have been developed [F. Habashi, "Metallurgical plants: How mercury pollution is abated", Env. Sci. & Tech., 12 (13), 1372 (1973)] intended to eliminate mercury from roasting gases, processes that lead to the obtaining of one or various compounds of this element, which only allow three alternatives: storage, sale to a plant to obtain mercury, or processing in the plant of origin.

Since the present invention is based in part on one of these processes, specifically on Spanish priority patent No. 411.067 Jan. 29, 1973 and on an improvement of the same [Sp. Pat. 556.731 Jun. 25, 1986, a brief summary of these is given below.

The process as described in the said patent and related publications [see A. Cuadra et al., "CENIM process for purification and recovery of mercury from waste gases of metallurgical plants". I International Mercury Congress, tome I, page 317, Barcelona 1973] considers thiocyanate as an agent capable of facilitating the oxidation of mercury in the gas using $SO_2$, which contains:

Spanish patent 556.731 introduces the novelty over the original one of the addition of active carbon to the thiocyanate solution to increase reaction velocity.

FIG. 1 shows the layout of a conventional plant to which the mercury purification system has been added.

The process is made up of the following: a conventional cooling system for the gases (obtained in a roasting oven [1]) up to a temperature below 40° C. (generally between 30° and 35° C.) [2]; two conventional electro-precipitation system [3][4]; one or two towers irrigated, in closed circuit, with a solution of sodium thiocyanate [5][6]; a thickener [8] where, after degassing, insoluble products captured in [2] and [3] are concentrated, removing from them a clear aqueous solution that is used in part for the cascade system of [2] and [3], and the rest sent to the conventional treatment system [9] for factory effluents.

The cooling system included in the block [3], usually consists of a first (empty) mist tower where the gases reach some 650° C. after passing through heat recovery boilers and dry electrofilters (electrostatic precipitators); there the gases are cooled to some 60°–70° C., and in some cases mercury condensation begins, occurring when the content of this element in the gas, within this range of temperatures, is more than 300 to 550 mg/m3. However, due to the super-saturation phenomenon [see A. Cuadra et al., Rev. Metal. CENIM, 7(4), 292 (1971), and the communication given during the 100th Annual Meeting of the A.I.M.E. in New York, 2 Mar. 1971], even if the gases have a mercury content above these figures, only a small fraction of the latter will condense; on the other hand, in the slimes collected in the thickener for this tower, an appreciable quantity of mercury appears combined with chloride, sulphur and selenium. The gases, saturated with humidity, then pass to a second stage for cooling in tubular type coolers with internal irrigation to clean encrustations off the wall where the gas circulates; these coolers are usually patented models, among them the one protected by Spanish patent 483.713.

Independently of which gas purifying procedure is used, as can be seen the layout confronts problems derived from the tailings obtained.

The storage of tailings comes up against ecological problems; sale of tailings, at the best, means having to pay a heavy penalty and, above all, overcome the ever-growing obstacles placed by governments against their circulation. Processing in the plant or origin demands installations that are often out of all proportion to the mercury production expected.

BRIEF SUMMARY OF THE INVENTION

The present invention is based on a known mercury purification process to treat gases with high mercury content, so that the mercury can be collected by condensation during gas cooling. The selected process must include the condition of not introducing foreign elements into those in the mineral, or if these elements are noxious (chloride for example), their presence must not be increased by adding to them; specifically the most appropriate is considered to be the one described in Spanish patent 411.067 (Jan. 29, 1973), improved by 556.731, with the modifications explained below to better adapt it to this specific process.

The overall process, as shown in FIG. 2 includes, aside from conventional equipment described in FIG. 1, a second (in reality the first) irrigation tower with a solution of thiocyanate [5] and what constitutes an essential part of the present invention, the treatment of the slimes that are obtained in the filters or thickeners of the system to recover the mercury in metallic form. The thick slimes obtained in [8], and those from the electro-precipitator [4], undergo treatment with ammonium [10] to obtain metallic mercury (that after a purification treatment in [12] is put into containers) and a slime in a small thickener that leaves a thick pulp which is periodically recycled to the oven, and a solution that goes to conventional treatment [9] for plant effluents treatment. Finally, the solids periodically removed from the towers [5] and [6] in a filter [11], are also recycled to the oven.

BRIEF DESCRIPTION OF THE DRAWINGS

FIG. 4 is a more detailed view of items 10 and 12 of FIG. 2.

DETAILED DESCRIPTION OF THE INVENTION

In the above mentioned cooler, where the gas temperature is lowered to some 35° C., using a complex condensation mechanism described in the reference mentioned previously, the greater part of the mercury is taken from the gas that remains with a content of mercury vapour of some 50 mg/m3. However the metallic mercury collected is in the form of an emulsion difficult to break down by physical means, and this is the point where the new part of the present invention begins.

It is obvious that if the gas on entry has a content of less than 50 mg/m3 (figure only reached when its content in the product to be roasted is more than 100-150 ppm) it will only be possible to collect the mercury combined with Cl, S and Se, and this, together with the fact that during chemical cleaning of the gas the mercury is collected as sulphur, makes it difficult to obtain metallic mercury as the sole end product of this process.

The solution that the present invention has found for this problem is the periodic recycling of these two types of tailings.

Figure 1:
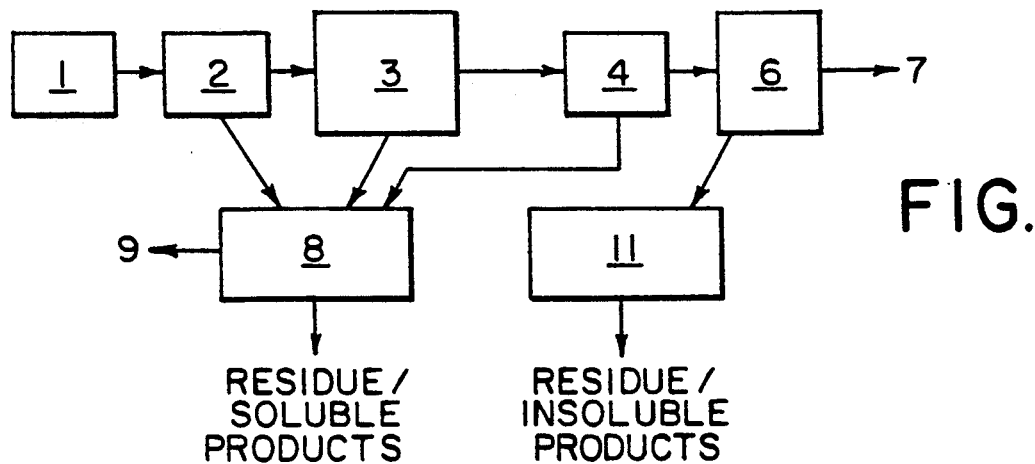
FIG. 1 is a schematic representation of a mercury recovery system in the prior art.

As indicated, the first tailing (from [8], FIG. 1) may contain as well as S and Se (whose natural cutlet is through [7] and [9] respectively) Cl that preferably tends to join with the mercury, forming $Hg_2Cl_2$ and which, as has been proved, is one of the causes of the stability of the mercury emulsion that appears in the slimes obtained from [8].

The equipment shown in FIG. 2 as block [10] has the basic mission of eliminating the chlorine (chloride), and thus on the one hand avoiding the recycling of this element and, on the other, achieving the breakdown of the emulsion under conditions explained below, and obtaining the coalescence of the mercury forming a liquid phase easy to separate from the aqueous pulp.

The present invention covers the enrichment with mercury of the raw material so that the product fed to roasting has contents of that element of 500 ppm or more. In this way, during this period of time the mercury content in the roasting gases reaches at least 200 mg/m3. However, if the raw material has relatively high chlorine contents it will be necessary to go to greater amounts, for which the only problem is in extending the times between the moments when the enriched charge is introduced. Enrichment is obtained by; mixing the raw material as such with other products rich in mercury (obviously it is impossible to use those that contain noxious elements both for the final obtaining of sulphuric acid and for the aims for which the roasting tailings are intended) and/or recycling the mercuriferous compounds produced in [10] and [11] as shown in FIG. 2.

The presence during more or less long periods of time, of very high mercury contents in the gas, means that the chemical purification process using thiocyanate, maintaining the essentials of that mentioned in Spanish patent 411.067, must be substantially modified to adapt it to these circumstances.

Modifications to the thiocyanate process

Although the reactions that determine the fixing of the mercury in the gas are in fact those expressed before using equations [1], [2] and [3], it has been noted that when a certain amount of the complex $Hg(SCN)_4^{2-}$ has been formed, the following takes place according to two clearly defined stages: so that the reaction occurs faster as the concentration of mercury in the solution is increased providing the reaction [3.2] is sufficiently rapid to consume the $Hg_2(SCN)_2$ produced. Otherwise the reaction reaches equilibrium [3,1] that, together with that in [1], means that the concentration of mercury in the gas cannot go lower than a determined amount. The addition of active carbon powder to the thiocyanate solution, claimed in Spanish patent 556.731, is able to accelerate the reaction [3.2] so that the determining velocity of the overall reaction [3] is that of [3.1], avoiding the formation of insoluble $Hg_2(SCN)_2$.

This mechanism means a substantial modification of the mentioned patents 411.067 and 556.731 in their use for gases containing high amounts of mercury and large flows, such as those used in the industrial manufacture of sulphuric acid (40000 to 100000 m3N/h). It is necessary:

a) Unlike those indicated in the patents, to not limit externally the growth of mercury in solution.
b) It is essential to add active carbon, but maintaining its activity by periodic renewal of the same.
c) It is necessary, therefore, to have available a control system that notifies with sufficient time when the active carbon has lost its activity.

Figure 3:
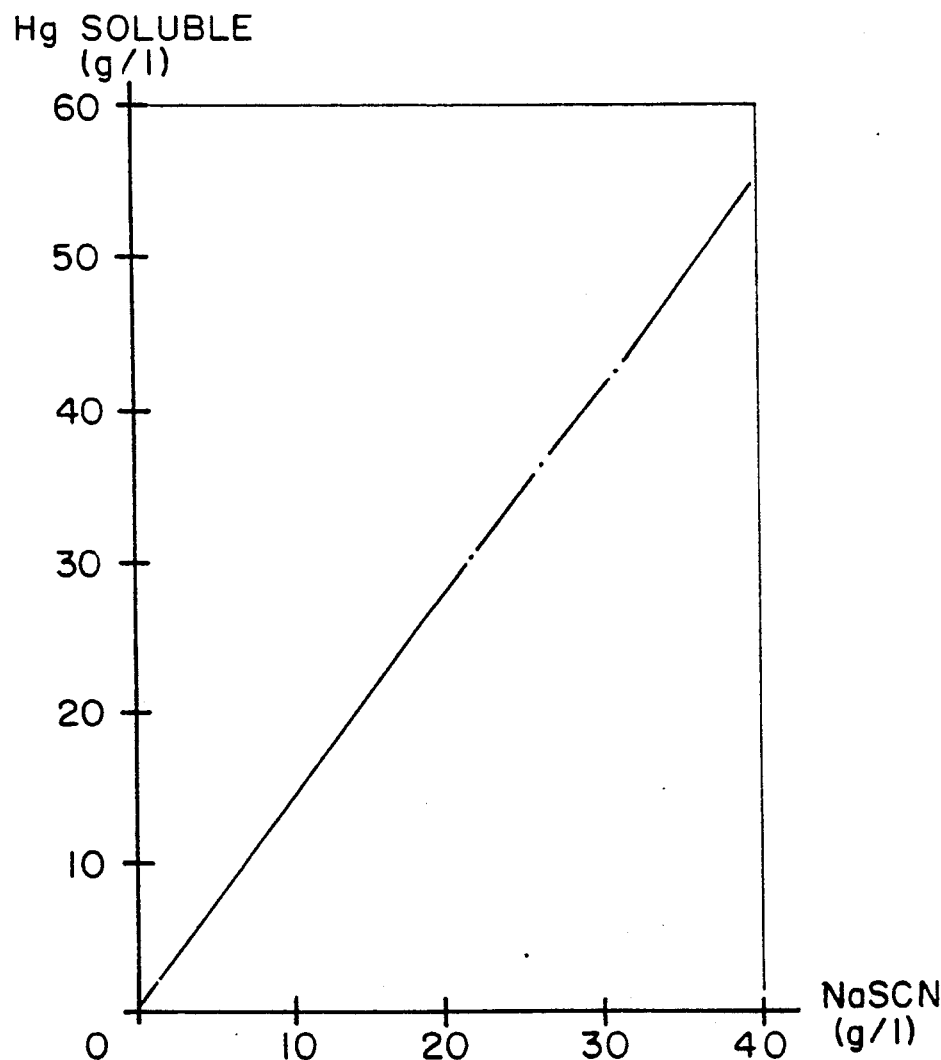
FIG. 3 is a graphical representation of the relationship between the solubility of mercury against the concentration of NaSCN under reaction conditions found within the present invention.

We show below how the present invention resolves these three key points:

The maintenance of a high concentration of mercury in solution is, in principle, related to the solubility of the $Hg(SCN)_2$ in a solution of thiocyanate. In the case of sodium thiocyanate, at 20° C. this has been determined by A. K. Agrawal and R. C. Mehrotra [Z. Anorg. Allgem. Chem., 312, 230 (1961)], based on whose data FIG. 3 has been drawn. As can be seen in example 2, the concentration of mercury in solution reaches a figure below that of the solubility of the $Hg(SCN)_2$ because before it begins to precipitate spontaneously as sulphur (HgS), possibly due to the reaction of the mercury with the tetrathionate, it reaches a limit figure of some 30–35 g/l of mercury in solution, sufficient to give a high reaction velocity with the advantage that the mercury eliminated from the gas is transformed into a chemical compound that presents no difficulty for recycling in the roasting oven.

The maintenance of carbon activity, by its periodic renewal, is a key point for the correct working of the process, since little by little, possibly due to a blockage of the active points, the carbon looses its activity causing a decrease in reaction velocity [3.2]. Since the reaction velocity [3,1] is then greater than that of [3.2], a white precipitate of $Hg_2(SCN)_2$ appears which not only causes the mercury to begin to rise towards the tower outlet, but also as a consequence of the reversibility of the reaction [3,1] can give rise, apparently paradoxically, to the mercury content in the outlet gas being greater than what it had at the intake.

The mercury content, that during the first days after adding active carbon, is practically nil (40,05 mg/m3) begins after a very variable period of time, to give amounts greater than 0,1 mg/m3. Starting from a determined amount, different according to whether it is in the first or second tower, it is necessary to then filter the solution, separating the carbon and the sulphur from the mercury, using the solution again after replacing the active carbon.

The need to use two towers and an intermediate mist separator

The brusque cooling of a gas as occurs in the treatment of roasting gases, gives rise to the formation of mists as the vapours it contains condense. This phenomenon is very well known by manufacturers of sulphuric acid because these mists, if not eliminated before the gas reaches the drying tower, cause the undesirable white "plume" in the gas outlet chimney.

Although there are various ways of eliminating these mists, the universally accepted solution consists of using two groups (in industrial argot we talk about two fields) of electrofilters or wet electrostatic precipitators which, when working properly, give almost 100% efficiency; any failure in their working, generally due to the breakage of any of the "strands", causes the appearance of the "plume" in the chimney.

In the case of gases containing condensable mercury, the mists are of water and mercury, and in this case the group of absorption tower and electrofilter form a very closely related unit. In fact, while the water has no noxious effect on the manufacture of acid, since it is used to obtain it, mercury must be practically eliminated before the gas enters the acid manufacturing process, where it would be totally fixed.

The present invention claims the use of two absorption towers irrigated with a solution of thiocyanate (as described in the previous section) and two fields of electrofilters, with the whole laid out as follows (in the direction of the gas):

First field of electrofilters
First absorption tower
Second field of electrofilters
Second absorption tower.

The working conditions are as follows:

In the first field of electrofilters the greater art of the water-mercury mist is collected. The mercury contents in the gas leaving the equipment is some 40–60 mg/m3 in the form of vapour, and an undetermined amount, but of the same order, in the form of liquid due to the mechanical dragging of the drops that have formed on the walls of the electrofilter tubes.

The gas with mercury vapour and small drops (not mist) of water-mercury in suspension, reach the first absorption tower where the drops are collected by mechanical impacting, and also part of the mercury vapour. Due tot he large amount of mercury reaching this tower, it is difficult to avoid the formation of $Hg_2(SCN)_2$. In spite of the addition of active carbon, the bubbler flask (described earlier) usually gives a mercury content in equilibrium of between 3 and 6 mg/m3. The presence of active carbon, however, is necessary so that through reaction [3,2] there is regeneration of the $Hg(SCN_4^{2-}$ necessary to fix the mercury in one way or another.

Although the major part of the mists have been transformed into droplets of mercury the majority of which are collected in the base of the electrofilter or captured in the first tower, on the outlet from this the gas carries approximately, and as well as 3–6 mg/m3 of mercury vapour, 0,3–05 mg/m3 of mercury as mist. This small amount of mercury needs to be captured or transformed into droplets in a second field of wet electrofilters.

Since the mercury content in the gas leaving this second field is under the dew point, starting at this point the gas has no possibility of forming mists with mercury. In this way the second tower, if care is taken to maintain the activity of the active carbon, and in the design a sufficiently efficient drops separator is placed (to avoid the solution being dragged along), we are in a condition to purify the mercury contents in the gas at the outlet to less than 0,1 mg/m3.

Collection and purification of the mercury

Since practically both the water going to effluents treatment and the gases going to the sulphuric acid plant, may be considered free from mercury, the only outlet for this is in the slimes that are collected in the thickener(s) in the washing and cooling tower.

These slimes, that may reach a content of more than 40% mercury, present this in the form of a fine emulsion that cannot be separated from the rest by physical means. An essential part of the present invention is the manner of carrying out this separation, for which there are no other antecedents than the procedure of "soot" treatment described in Spanish patent 356.385, which is used successfully for the separation of mercury in the emulsion obtained from conventional plants for obtaining mercury from cinnabar.

Figure 2:
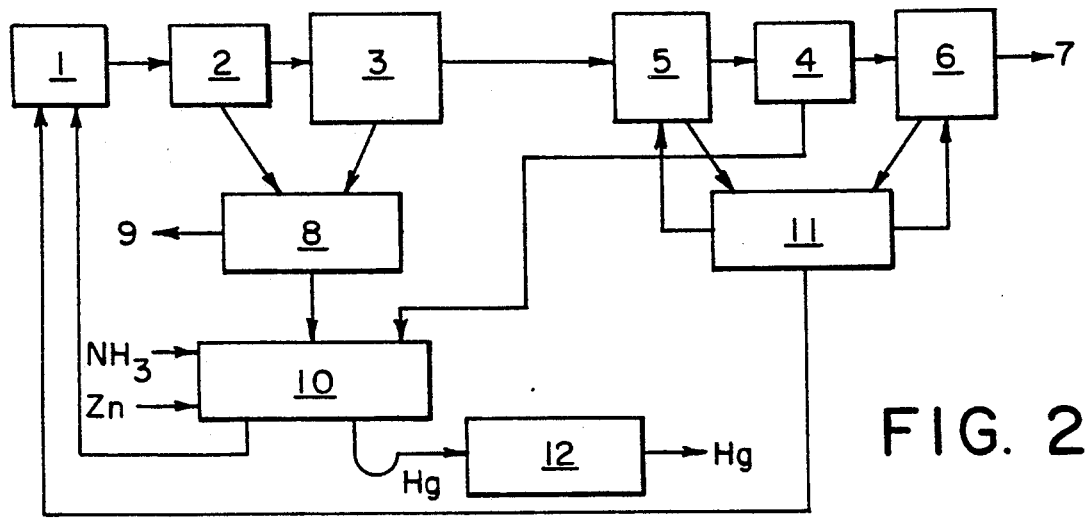
FIG. 2 is a schematic representation of a mercury recovery system of the present invention.
Figure 4:
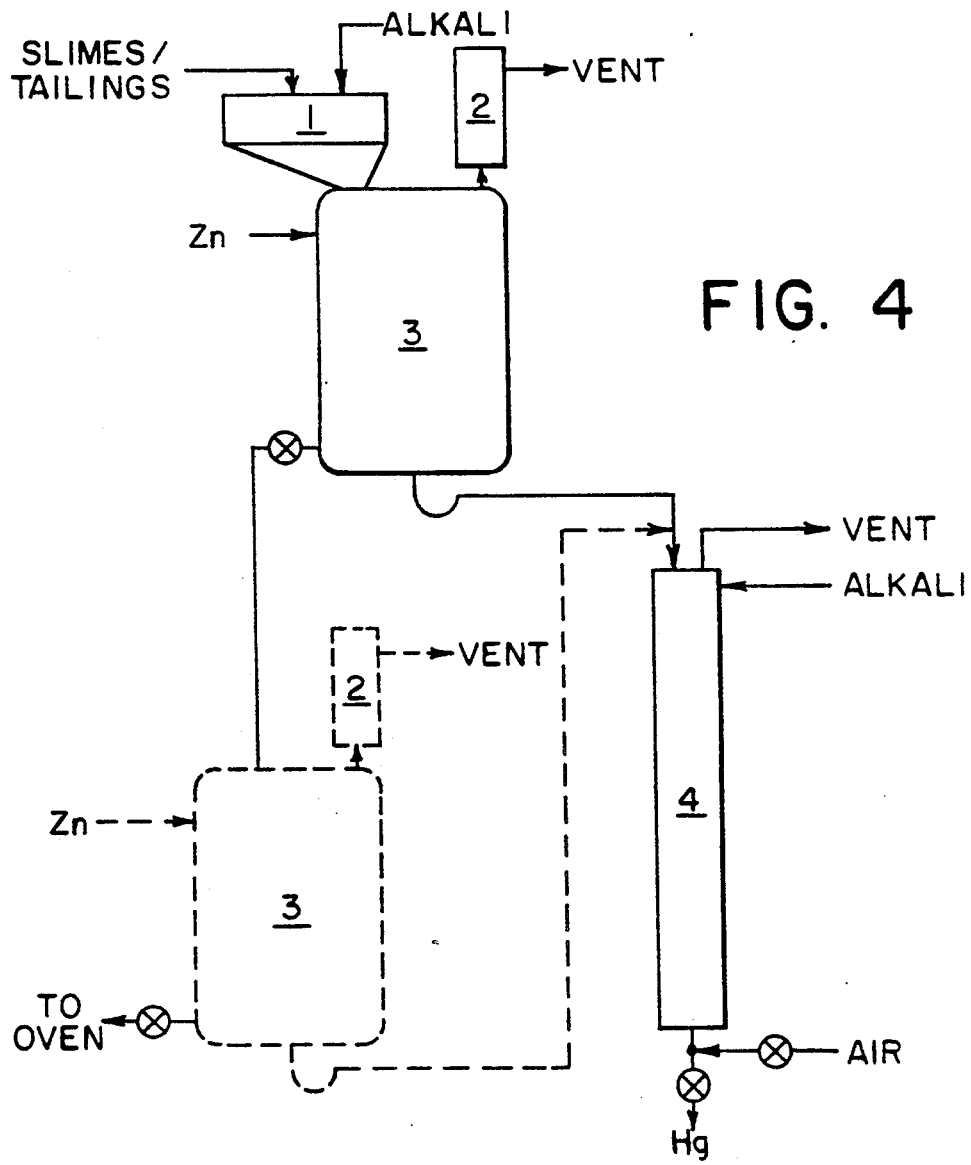
FIG. 4 is a schematic representation of one of the improvements over the prior art and an alternative embodiment of the present invention.

Due to the different nature of the emulsion obtained in the condensation of gases from sulphides roasting ovens, this procedure has been found to be inefficient. Research carried out has led to a new treatment system that allows the cycle described to be closed by the present invention for the recovery of mercury in metallic form in the treatment of ores that contain it. FIG. 4 shows the layout of the process:

The hopper 1 receives the slimes from the thickener in the roasting plant [8 in FIG. 2] that are discharged into a reactor 3 with an agitation system and a reflux cooler and hydraulic shutter 2 to equalise the internal pressure with the atmosphere. Thereafter is added a concentrated solution of ammonia (aqueous solution of 20 to 20°Be) that in some cases may be substituted by a solution of sodium hydroxide (commercial solution of NaOH at 40-50% by weight) and zinc granules. The mixture is heated to 50°-70° C. and maintained under agitation for a time of 6 to 8 hours, after which normally 80% of the mercury has collected on the bottom of the reactor from which it is removed, after stopping agitation, by syphoning; the pump, if it still contains important quantities of mercury, passes by gravity to a second reactor identical to the first, to which is added zinc granules and agitation is continued, maintaining a temperature of 50°-70° C., for at least 8 hours, while the upper reactor begins a new operation. The mercury collected in the second reactor is also syphoned off, while the remaining pump that still may contain mercury, goes to a solid/liquid separation system (filter, centrifuge or decanter) returning the wet solids to the oven, when the water, practically clean of mercury, goes for effluents treatment.

The liquid mercury thus obtained normally has an undesirable content of metallic impurities, particularly Pb and Zn, which are easily eliminated by oxidation treatment in column 4 where, with the use of an alkaline solution and the passage of compressed air that, in turn, helps to agitate the mixture, these elements are separated by oxidation from the mercury.

We claim:

1. Process for the purification and recovery of mercury in metallic form adaptable for use in conventional roasting plants for minerals containing the same, comprising cooling a roasting gas containing mercury, produced by roasting of minerals containing the same, resulting in condensates and a cooled roasting gas, passing the cooled roasting gas through at least two irrigation towers, each tower utilizing an irrigation solution of sodium thiocyanate with activated carbon in suspension for contact with the cooled roasting gas, producing tailings and an irrigated cooled roasting gas, the irrigation towers connected to each other in series by a mist separator device that minimizes the transmission of irrigation solution, activated carbon and tailings from one tower to the other, passing the irrigated cooled roasting gas through a filter prior to discharge into the environment, collecting the condensates, tailings, and filtrates, combining the condensates, tailing and filtrates to produce slimes, and refining the slimes into mercury in its elemental metallic form.

2. Process for removing mercury in its elemental metallic form from a roasting gas according to claim 1, in which the content of sodium thiocyanate in the irrigation solution within the irrigation towers is between 15 and 60 g/l and the activated carbon is present in a concentration greater than 5 g/l.

3. Process for removing mercury in its elemental metallic form from a roasting gas according to claim 1, without stopping the irrigation process of any tower, in which the activity of the activated carbon is maintained by draining about 40 to 60% of the irrigation solution containing tailings from an irrigation tower when the mercury content of the irrigated cooled roasting gas exiting said irrigation tower exceeds 0.1 $mg/m^3$, separating the tailings from the irrigation solution, returning the irrigation solution to the corresponding irrigation tower, recycling the tailings to be roasted.

4. Process for removing mercury in its elemental metallic form from a roasting gas according to claim 1, in which the mist separator device between the irrigation towers is a wet electrofilter.

5. Process for removing mercury in its elemental metallic form from a roasting gas according to claim 1, in which mercury is refined to its elemental metallic form by treating the slimes in at least one tank containing a solution of about 10 to 20% $HN_3$ at a temperature about 50°-70° C. and aerating the solution of ammonia and slimes utilizing agitator means.

6. Process for removing mercury in its elemental metallic form from a roasting gas according to claim 5 in which the ammonia solution is replaced, by a solution of 20 to 60 g/l of sodium hydroxide.

7. Process for removing mercury in its elemental metallic form from a roasting gas according to claim 5 in which between 1 and 5 g/l of zinc granules are added to the tanks containing the ammonia solution and slimes to reduce the mercury to its elemental metallic form.

8. Process according to claim 5 in which mercury if further reacted to produce its elemental metallic form by collecting the mercury from the bottom of the tank containing the ammonia solution and the slimes, adding a solution of 10 to 60 g/l of carbonate ions under agitation to the collected mercury to obtain an aqueous mixture of mercury and residual solid material, separating the mercury from the residual solid material and the aqueous solution, separating the residual solid material from the aqueous solution, and recycling the residual solid material to be roasted.

9. A process for removing mercury in its elemental metallic form from a roasting gas, comprising roasting a starting material containing mercury at a temperature of about 650° C. to obtain a roasting gas, cooling the roasting gas to a temperature of less than 40° C. to obtain condensates and a cooled roasting gas, passing the cooled roasting gas through an alternating plurality of irrigation towers, containing thiocyanate ions and activated carbon, and mist separator devices to obtain tailings and an irrigated cooled roasting gas, passing the irrigated cooled roasting gas through a filter to obtain filtrates prior to discharge of the gas to the environment, collecting condensates, solid effluent materials, and filtrates, combining condensates, solid effluent materials, and filtrates to obtain slimes, treating the slimes, at least once, with a solution of 10 to 20% ammonia at about 50°-70° C. under agitation for 6-8 hours to obtain an aqueous mixture of mercury and residual solids, separating the mercury from the residual solids and the aqueous solution, separating the residual solids from the aqueous solution, recycling the residual solids to be roasted, reducing the separated mercury with a reducing agent, and collecting the mercury in its elemental metallic form.

10. A process for removing mercury in its elemental metallic form from a roasting gas according to claim 9, in which the ammonia solution is replaced with a solution of 20 to 60 g/l of sodium hydroxide.

11. A process for removing mercury in its elemental metallic form from a roasting gas according to claim 9, in which the reducing agent is zinc at a concentration of about 1 to 5 g/l.

* * * * *